(12) United States Patent
Yoshioka et al.

(10) Patent No.: US 10,429,898 B2
(45) Date of Patent: Oct. 1, 2019

(54) ELECTRONIC DEVICE (71) Applicant: KYOCERA CORPORATION, Kyoto (JP)

(72) Inventors: Yuki Yoshioka, Yokohama (JP); Kengo Suzuki, Ikoma (JP); Shuichi Kutsuzawa, Isehara (JP); Hiroyuki Fukuhara, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/499,713

(22) Filed: Apr. 27, 2017

(65) Prior Publication Data
US 2017/0227992 A1 Aug. 10, 2017

Related U.S. Application Data (63) Continuation of application No. PCT/JP2015/079925, filed on Oct. 23, 2015.

(30) Foreign Application Priority Data

Oct. 29, 2014 (JP) .................. 2014-220296

(51) Int. Cl.
G06F 1/16 (2006.01)
B29C 67/24 (2006.01)
(Continued)

(52) U.S. Cl.
CPC ........ G06F 1/1656 (2013.01); B29C 45/1657 (2013.01); B29C 67/24 (2013.01);
(Continued)

(58) Field of Classification Search
CPC ...... G06F 1/1656; H04M 1/18; H01R 13/447; H01R 13/5213; B29C 67/24;
(Continued)

(56) References Cited

U.S. PATENT DOCUMENTS 6,132,241 A * 10/2000 Hwang ................ H01R 12/675
439/405
6,991,490 B1 * 1/2006 Su ...................... H01R 13/5213
439/136

(Continued)

FOREIGN PATENT DOCUMENTS

JP 2010-194902 A 9/2010
JP 2011244247 * 12/2011 .............. H04M 1/02

OTHER PUBLICATIONS

Translation of JP 2011244247.*

Primary Examiner — Steven T Sawyer
Assistant Examiner — Sagar Shrestha
(74) Attorney, Agent, or Firm — Duane Morris LLP (57) ABSTRACT An electronic device includes a housing having an opening, a connection terminal located in an opening in the housing, and a terminal cover including a first resin member having a first surface facing the connection terminal and a second surface located opposite to the first surface and a second resin member located on the second surface. At least a portion of the second resin member covers a depression located on an outer peripheral portion of the first surface of the first resin member.

6 Claims, 6 Drawing Sheets (51) Int. Cl.

| | |
|---|---|
| *H01R 13/447* | (2006.01) |
| *H04M 1/18* | (2006.01) |
| *B29C 45/16* | (2006.01) |
| *H01R 13/52* | (2006.01) |
| *H04M 1/02* | (2006.01) |
| *B29K 67/00* | (2006.01) |
| *B29K 69/00* | (2006.01) |
| *B29L 31/34* | (2006.01) |

(52) U.S. Cl.
CPC ....... *H01R 13/447* (2013.01); *H01R 13/5202* (2013.01); *H01R 13/5213* (2013.01); *H01R 13/5216* (2013.01); *H04M 1/0202* (2013.01); *H04M 1/18* (2013.01); *B29K 2067/00* (2013.01); *B29K 2069/00* (2013.01); *B29K 2995/0098* (2013.01); *B29L 2031/3437* (2013.01); *B29L 2031/3481* (2013.01)

(58) Field of Classification Search
CPC ........ B29K 2995/0098; B29K 2067/00; B29K 2069/00; B29L 2031/3437; H05K 5/0239
USPC .................................................. 439/135, 892
See application file for complete search history.

(56) References Cited

U.S. PATENT DOCUMENTS

| | | | |
|---|---|---|---|
| 2002/0119697 A1* | 8/2002 | Chan ................... | H01R 13/5213 439/519 |
| 2009/0219676 A1* | 9/2009 | Murakata ............. | H05K 5/0086 361/679.01 |
| 2011/0157791 A1* | 6/2011 | Park ..................... | H04M 1/0274 361/679.01 |
| 2011/0211300 A1* | 9/2011 | Mori ..................... | G06F 1/1656 361/679.01 |
| 2013/0044420 A1* | 2/2013 | Iwamoto .............. | H01R 13/447 361/679.01 |
| 2014/0080334 A1* | 3/2014 | Tetsuya .............. | H01R 13/5213 439/136 |
| 2014/0085784 A1* | 3/2014 | Lee ...................... | H05K 5/0221 361/679.01 |
| 2014/0368994 A1* | 12/2014 | Lee ...................... | G06F 1/1656 361/679.55 |
| 2015/0022955 A1* | 1/2015 | Yamaguchi .......... | H05K 5/0239 361/679.01 |

* cited by examiner

ELECTRONIC DEVICE

CROSS-REFERENCE TO RELATED APPLICATION

The present application is a continuation based on PCT Application No. PCT/JP2015/079925 filed on Oct. 23, 2015, which claims the benefit of Japanese Application No. 2014-220296, filed on Oct. 29, 2014. PCT Application No. PCT/JP2015/079925 is entitled "Terminal Cover and Electronic Device", and Japanese Application No. 2014-220296 is entitled "Terminal Cover and Electronic Device." The content of which are incorporated by reference herein in their entirety.

FIELD

The present disclosure relates to an electronic device including a terminal cover.

BACKGROUND

In recent years, various types of electronic devices, such as a personal digital assistant, improved in functionality have been developed. Such an electronic device includes connection terminals, such as a charging terminal, a card terminal, and a headphone jack, mounted thereon. Such a connection terminal is located in an opening in a housing of the electronic device, and the opening is closed with a removable terminal cover.

Such a terminal cover may be molded by a double molding method using a first resin and a second resin.

SUMMARY

An electronic device includes a housing having an opening, a connection terminal located in an opening in the housing, and a terminal cover including a first resin member having a first surface facing the connection terminal and a second surface located opposite to the first surface and a second resin member located on the second surface. At least a portion of the second resin member covers a depression located on an outer peripheral portion of the first surface of the first resin member.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments of the present disclosure will be described in detail with reference to the drawings. The following embodiments will be described illustrating mobile terminal devices, such as a mobile phone, a smartphone, and a tablet terminal as examples of an electronic device. In the following embodiments, the same or common portions have the same reference characters allotted in the drawings, and description thereof will not be repeated.

It cannot be said that an example terminal cover of the background art has a sufficient peel strength, and when a force is applied to the terminal cover to a considerable degree, a first resin member molded from a first resin and a second resin member molded from a second resin may be separated from each other. The following disclosure can solve the above-described problem.

First Embodiment

Figure 1:
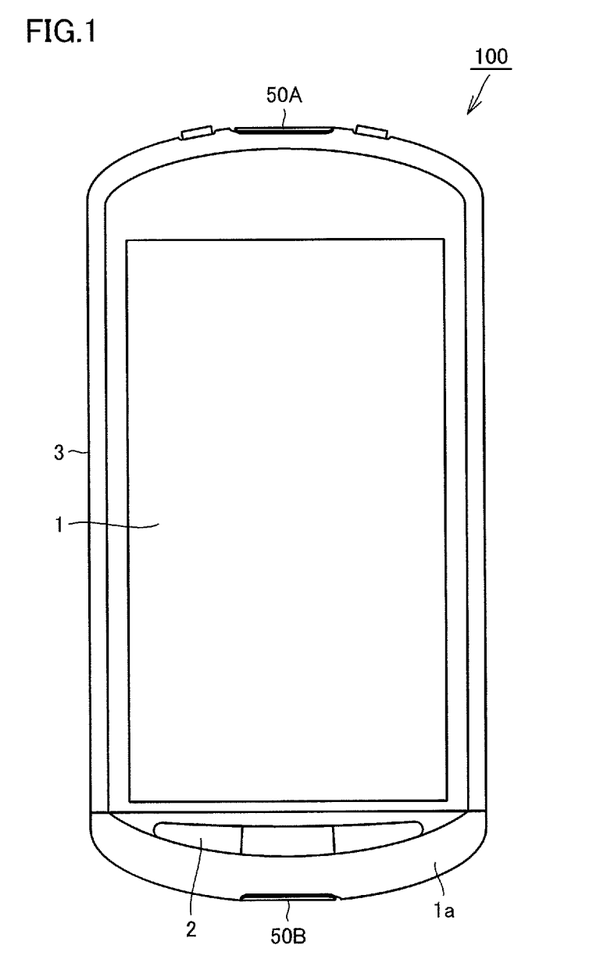
FIG. 1 is a front view of a mobile terminal device according to a first embodiment.
Figure 2:
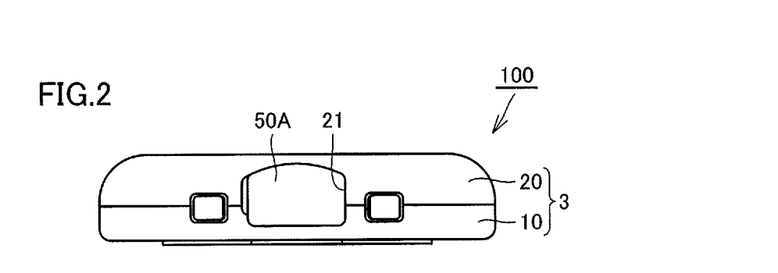
FIG. 2 is a side view of the mobile terminal device showing a portion where a first terminal cover is located.
Figure 3:
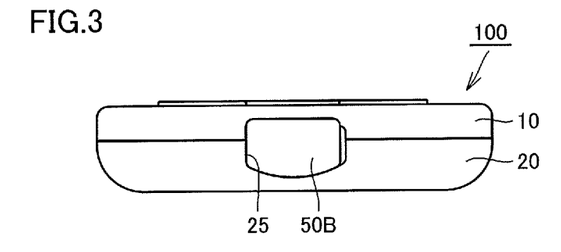
FIG. 3 is a side view of the mobile terminal device showing a portion where a second terminal cover is located.

FIG. 1 is a front view of a mobile terminal device according to a first embodiment. FIGS. 2 and 3 are side views of the mobile terminal device respectively showing portions where a first terminal cover and a second terminal cover are located. Referring to FIGS. 1 to 3, a mobile terminal device 100 according to the first embodiment will be described.

As shown in FIG. 1, mobile terminal device 100 according to the first embodiment includes a display 1, an operating portion 2, a housing 3, a first terminal cover 50A, and a second terminal cover 50B. Display 1 is located so as to be exposed through a window of housing 3 located on the front side. A liquid crystal display including a touch panel, for example, or the like can be employed as display 1. Instead of the liquid crystal display or the like, an organic electroluminescence display may be used.

Operating portion 2 includes a plurality of operation buttons with predetermined functions assigned thereto. By pressing each operation button, an operation corresponding to the function assigned to the operation button is performed.

Housing 3 includes a front housing 10 and a rear housing 20. A circuit board (not shown) for driving display 1 is located between front housing 10 and rear housing 20. Housing 3 includes openings 21 and 25. Openings 21 and 25 are located to extend to both of front housing 10 and rear housing 20.

Openings 21 and 25 are located in the side surfaces of housing 3 located on the upper and lower sides, respectively, when display 1 is seen from the front. Earphone terminal 4 (see FIG. 4) and a USB connector 5 (see FIG. 10) serving as connection terminals as will be described later are located in openings 21 and 25, respectively. The connection terminals are not limited to them, but various types of terminals, such as a power supply terminal, an external antenna terminal, a data terminal, or a memory device terminal, can be employed.

First terminal cover 50A can removably close opening 21. Second terminal cover 50B can removably close opening 25. First terminal cover 50A and second terminal cover 50B are manufactured by the double molding method. The double molding method is a molding method of molding a primary part and then molding a secondary part within the same mold integrally with the primary part.

In the first embodiment, first terminal cover 50A and second terminal cover 50B include a first resin member 30 (see FIGS. 4 and 10) and a second resin member 40 (see FIGS. 4 and 10) which will described later. First resin member 30 may be the primary part and second resin member 40 may be the secondary part, or first resin member 30 may be the secondary part and second resin member 40 may be the secondary part.

As the resin material for molding first resin member 30, PC (polycarbonate) resin can be employed, for example. As the resin material for molding second resin member 40, TPC (polyester elastomer) can be employed. First resin member 30 may have higher rigidity than second resin member 40.

Figure 4:
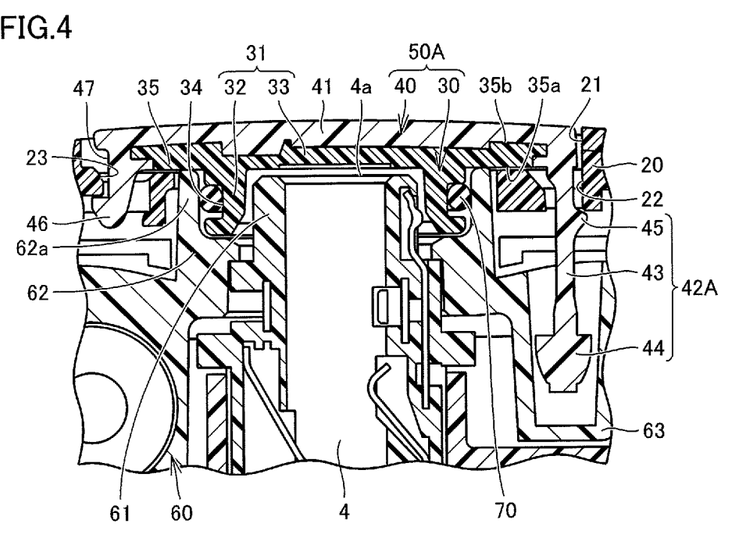
FIG. 4 is a cross sectional view of a principal part showing the first terminal cover shown in FIG. 2 and its neighborhood.
Figure 5:
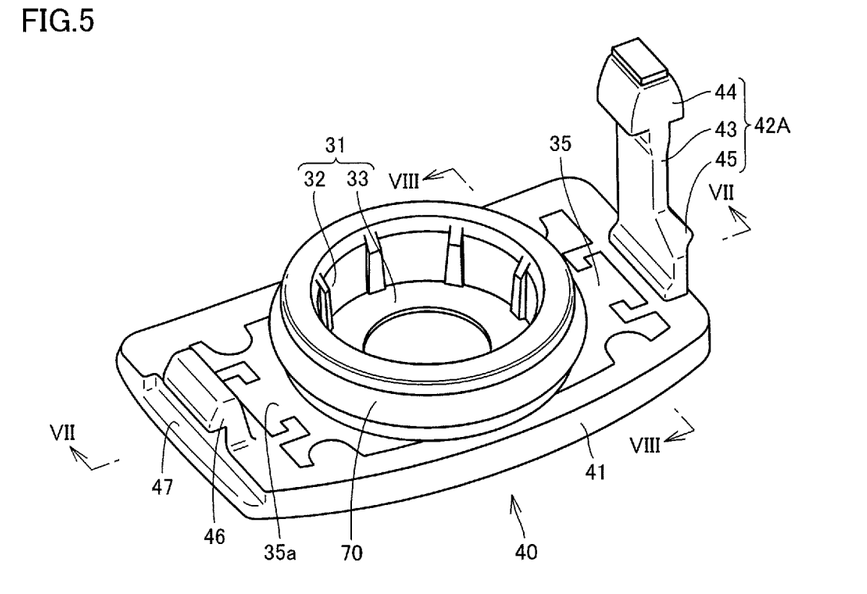
FIG. 5 is a perspective view of the first terminal cover according to the first embodiment.

FIG. 4 is a cross sectional view of a principal part showing the first terminal cover shown in FIG. 2 and its neighborhood. FIG. 5 is a perspective view of the first terminal cover according to the first embodiment. Referring to FIGS. 4 and 5, the structure of first terminal cover 50A will be described.

The structure within opening 21 will be described. As shown in FIG. 4, earphone terminal 4 and an inner frame 60 are located in opening 21. Inner frame 60 includes an earphone terminal support 61, surrounding portion 62 and an insertion portion 63. Inner frame 60 is located to surround the above-described circuit board, a battery and the like. The above-described circuit board, the battery and the like are located on the inner side of inner frame 60 opposite to housing 3.

Earphone terminal support 61 has a generally cylindrical shape, and supports earphone terminal 4. Surrounding portion 62 is located around earphone terminal support 61 to surround earphone terminal support 61. A leading end 62a of surrounding portion 62 is located with a spacing from earphone terminal 4 in the radial direction of earphone terminal 4. Insertion portion 63 is a section where a stopper 42A for first terminal cover 50A which will be described later is to be inserted. Insertion portion 63 is obtained by recessing inner frame 60 inwardly.

First terminal cover 50A will be described. As shown in FIGS. 4 and 5, first terminal cover 50A includes first resin member 30 and second resin member 40 as described above. First resin member 30 includes a plug 31 and a flange 35.

Plug 31 covers leading end 4a of earphone terminal 4 with first terminal cover 50A closing opening 21. Plug 31 corresponds to a cover that covers leading end 4a of earphone terminal 4. Plug 31 includes a peripheral wall 32 and a bottom 33. Bottom 33 is opposed to leading end 4a of earphone terminal 4. Peripheral wall 32 is located upright from the periphery of bottom 33. Peripheral wall 32 includes a groove 34 which is continuous in the circumferential direction. An annular packing 70 fits within groove 34.

Peripheral wall 32 fits within a clearance between earphone terminal support 61 and leading end 62a of surrounding portion 62. On this occasion, while being compressed, packing 70 abuts on the inner peripheral surface of surrounding portion 62 and the outer peripheral surface of peripheral wall 32. Accordingly, liquid, such as water, is less likely to enter the inner side of inner frame 60 through opening 21. Since first resin member 30 has higher rigidity than second resin member 40, the dimensional accuracy of first resin member 30 can be increased. Accordingly, peripheral wall 32 of plug 31 can be located precisely around surrounding portion 62. In this respect as well, adhesion between packing 70 and surrounding portion 62 and peripheral wall 32 can be increased, as a result of which waterproofness can be increased.

Flange 35 is located at least partly on the outer periphery of bottom 33. Specifically, flange 35 is located to protrude from the circumference of bottom 33 in the lateral direction of mobile terminal device 100 when display 1 is seen from the front. Flange 35 corresponds to the above-described cover and an outer peripheral portion located on the outer periphery of the cover. Flange 35 includes a first surface 35a facing earphone terminal 4 and a second surface 35b located opposite to first surface 35a.

Second resin member 40 is located to cover first resin member 30 from the side opposite to the side facing earphone terminal 4. Second resin member 40 is located to cover the outer edge of flange 35. Therefore, the circumference of second resin member 40 substantially contacts the inner peripheral surface of opening 21. Second resin member 40 thereby serves as a lid which closes opening 21.

Second resin member 40 includes a plate-like portion 41, stopper 42A and an engaging protrusion 46. Stopper 42A is located on one end of second resin member 40 in the longitudinal direction (the lateral direction of mobile terminal device 100 when display 1 is seen from the front). Stopper 42A extends in a direction substantially normal to the surface of second resin member 40 that faces earphone terminal 4.

Stopper 42A includes a shaft 43, a large-diameter portion 44 and a protrusion 45. Large-diameter portion 44 is located on the leading end of shaft 43. The diameter of large-diameter portion 44 is larger than the diameter of shaft 43. The diameter of large-diameter portion 44 is larger than the inner diameter of insertion portion 63. Protrusion 45 protrudes from the outer periphery of shaft 43 in the radial direction thereof.

When stopper 42A is inserted into insertion portion 63 through an insertion hole 22 located within opening 21 of housing 3, large-diameter portion 44 is inserted into insertion portion 63 while expanding the diameter of insertion portion 63. Large-diameter portion 44 is thereby located in insertion portion 63. Protrusion 45 is caught by an end of insertion hole 22 located on the inner side of housing 3. With large-diameter portion 44 clamped by insertion portion 63 and protrusion 45 caught by insertion hole 22, stopper 42A is locked in housing 3.

Engaging protrusion 46 is located on the other end of second resin member 40 in the longitudinal direction. Engaging protrusion 46 protrudes in a direction substantially normal to the surface facing earphone terminal 4. Engaging protrusion 46 removably engages with an engagement hole 23 located in opening 21. On the other end side of second resin member 40, a hook 47 is located at the base of engaging protrusion 46. Hook 47 is a section where a user hooks his/her nail for opening first terminal cover 50A.

Figure 6:
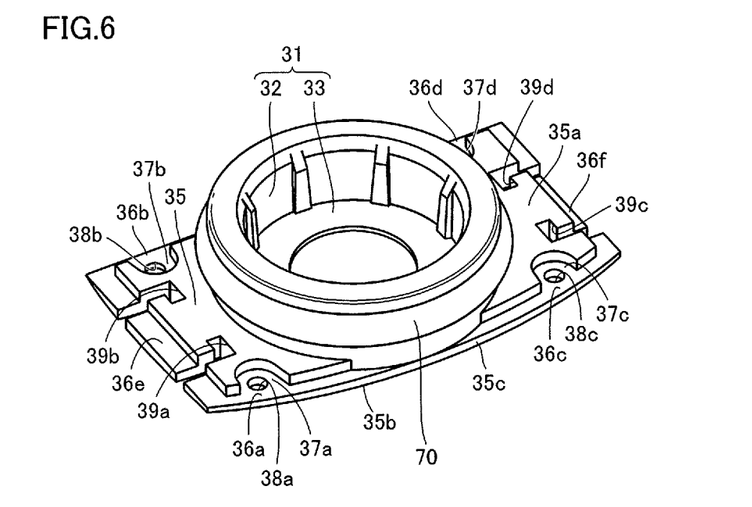
FIG. 6 is a perspective view showing a first resin member shown in FIG. 5.
Figure 7:
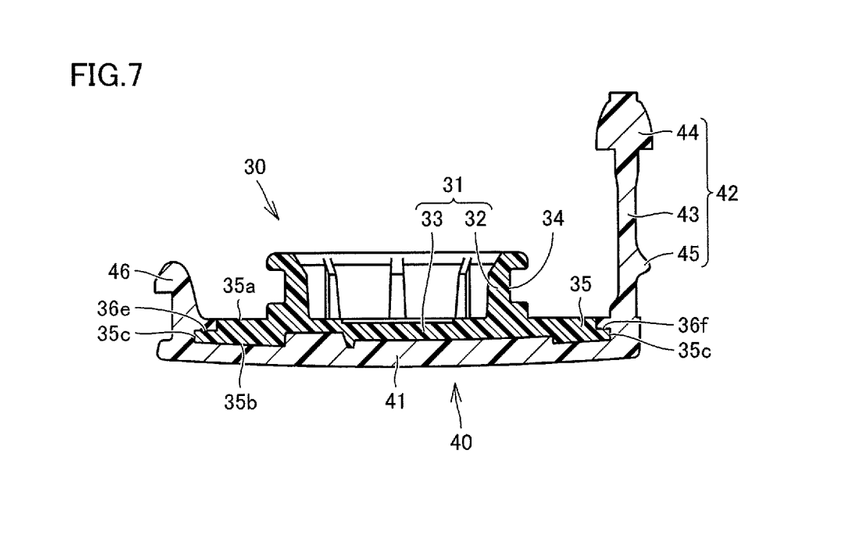
FIG. 7 is a cross sectional view taken along the line shown in FIG. 5.
Figure 8:
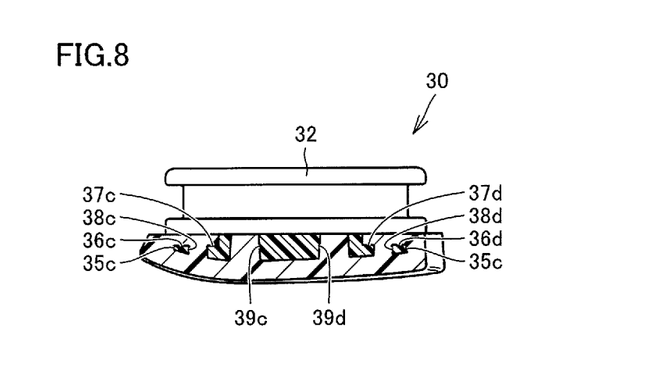
FIG. 8 is a cross sectional view taken along the line VIII-'VIII shown in FIG. 5.
Figure 9:
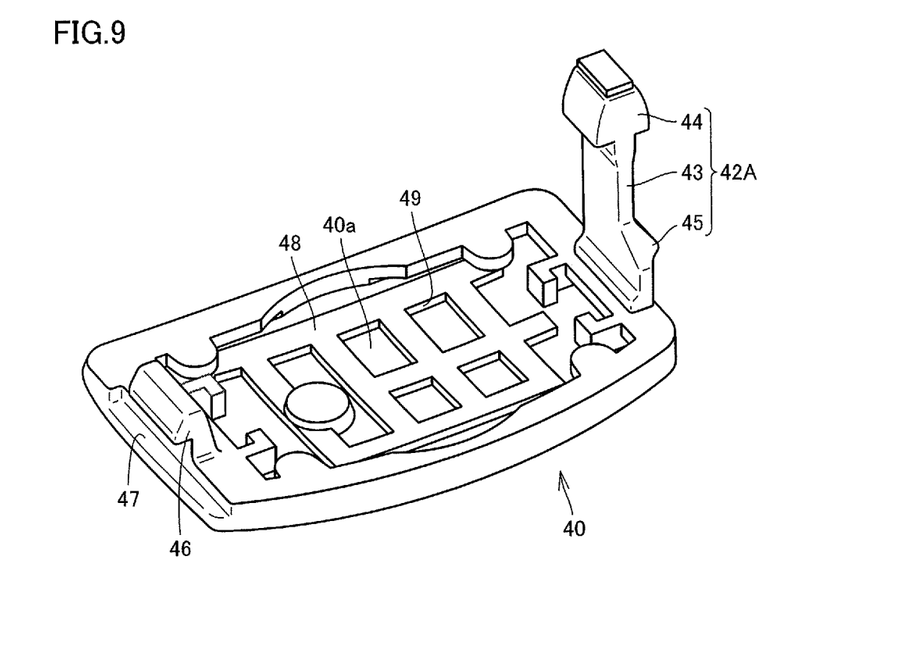
FIG. 9 is a perspective view showing a second resin member shown in FIG. 5.

FIG. 6 is a perspective view showing the first resin member shown in FIG. 5. FIG. 7 is a cross sectional view taken along the line VII-VII shown in FIG. 5. FIG. 8 is a cross sectional view taken along the line VIII-VIII shown in FIG. 5. FIG. 9 is a perspective view showing the second resin member shown in FIG. 5. Referring to FIGS. 6 to 9, the structure of first resin member 30 and second resin member 40 will be described in detail.

As shown in FIG. 6, first resin member 30 has a generally rectangular shape when seen in the axial direction of peripheral wall 32. First resin member 30 has a short-side direction (the front-back direction of mobile terminal device 100 when display 1 is seen from the front) and a longitudinal direction (the lateral direction of mobile terminal device 100 when display 1 is seen from the front). The width of flange 35 in the above-described short-side direction is almost equal to the outer diameter of peripheral wall 32.

First resin member 30 further includes depressions 36a to 36f and notches 39a to 39d. Depressions 36a to 36f are located along almost the entire outer edge of first surface 35a of flange 35.

Depressions 36a and 36c are located on the one end side of first resin member 30 in the short-side direction (the front-back direction of mobile terminal device 100 when display 1 is seen from the front). Depression 36a ranges from approximately the center of the outer edge on the one end side of first resin member 30 in the short-side direction to the other end side of first resin member 30 in the longitudinal direction. Depression 36c ranges from approximately the center of the outer edge on the one end side of first resin member 30 in the short-side direction to the other end side of first resin member 30 in the longitudinal direction.

Depressions 36b and 36d are located on the other end side of first resin member 30 in the short-side direction. Depression 36b ranges from approximately the center of the outer edge on the other end side of first resin member 30 in the short-side direction to the other end side of first resin member 30 in the longitudinal direction. Depression 36d ranges from approximately the center of the outer edge on the other end side of first resin member 30 in the short-side direction toward the one end of first resin member 30 in the longitudinal direction.

Depression 36e is located on the other end side of first resin member 30 in the longitudinal direction, and ranges from the one end side to the other end side of first resin member 30 in the short-side direction. Depression 36f is located on the one end side of first resin member 30 in the longitudinal direction, and ranges from the one end side to the other end side of first resin member 30 in the short-side direction.

The first embodiment has been described illustrating the case where the depressions are located on all of the both ends of flange 35 in the longitudinal direction and the both ends of flange 35 in the short-side direction, but this is not a limitation. Depressions may be located at least partly on the outer edge of flange 35.

Depressions 36a to 36d include hollows 37a to 37d and through-holes 38a to 38d, respectively (see FIGS. 6 and 8). Hollows 37a to 37d are depressed inwardly from an outer edge 35c of flange 35. Hollows 37a to 37d are located near the corners of flange 35, for example. Hollows 37a to 37d have a generally semicircular shape in plan view. The shape of hollows 37a to 37d is not limited to the generally semicircular shape in plan view, but can be modified appropriately to a semi-polygonal shape or the like.

The first embodiment has been described illustrating the case where there are four hollows, but this is not a limitation. There may be one or more hollows. In this case, the position of a hollow/hollows is not particularly limited, but it/they may be located on one end side of first resin member 30 in the longitudinal direction.

In depressions 36a to 36d, through-holes 38a to 38d extend through flange 35 from first surface 35a to second surface 35b. Although through-holes 38a to 38d are located substantially at the center of hollows 37a to 37d, their positions are not particularly limited as long as they are located in depressions 36a to 36d, respectively. A cylindrical shape, a polygonal tubular shape or the like can also be selected appropriately as the shape of through-holes 38a to 38d.

Notches 39a to 39d are located so as to extend inwardly from outer edge 35c of flange 35. Notches 39a to 39d are generally L-shaped. Specifically, notches 39a to 39d each include a first extending portion extending in the longitudinal direction of first resin member 30 and a second extending portion extending in the short-side direction of the first resin member from the leading end of the first extending portion. Notches 39a and 39b are located on the other end side of first resin member 30 in the longitudinal direction. Notches 39c and 39d are located on the one end side of first resin member 30 in the longitudinal direction.

The first embodiment has been described illustrating the case where notches are located on the both end sides of first resin member 30 in the longitudinal direction, but this is not a limitation. Notches may be located on one side of first resin member 30 in the longitudinal direction, or on one side or the both sides of first resin member 30 in the short-side direction. The shape and number of notches can also be modified appropriately.

As shown in FIGS. 6 to 8, second resin member 40 is located to cover depressions 36a to 36f from the second surface 35b side of flange 35 to the first surface 35a side of flange 35 across the outer edge of flange 35 at the locations where depressions 36a to 36f are located.

Second resin member 40 is located to cover hollows 37a to 37d. Second resin member 40 is located to fill through-holes 38a to 38d. Second resin member 40 is located to fill notches 39a to 39d.

As shown in FIG. 9, second resin member 40 includes, in a surface 40a to come into contact with a surface of first resin member 30 opposite to the surface facing earphone terminal 4, projecting and recessed features to be fitted into corresponding recessed and projecting features located in the surface of first resin member 30. The projecting and recessed features are obtained by locating a frame-like portion 48 including a plurality of recesses 49 on surface 40a of second resin member 40. Second resin member 40 is thus integrated with first resin member 30 so as to conform to the recessed and projecting features in the surface of first resin member 30 opposite to the surface facing earphone terminal 4.

Figure 10:
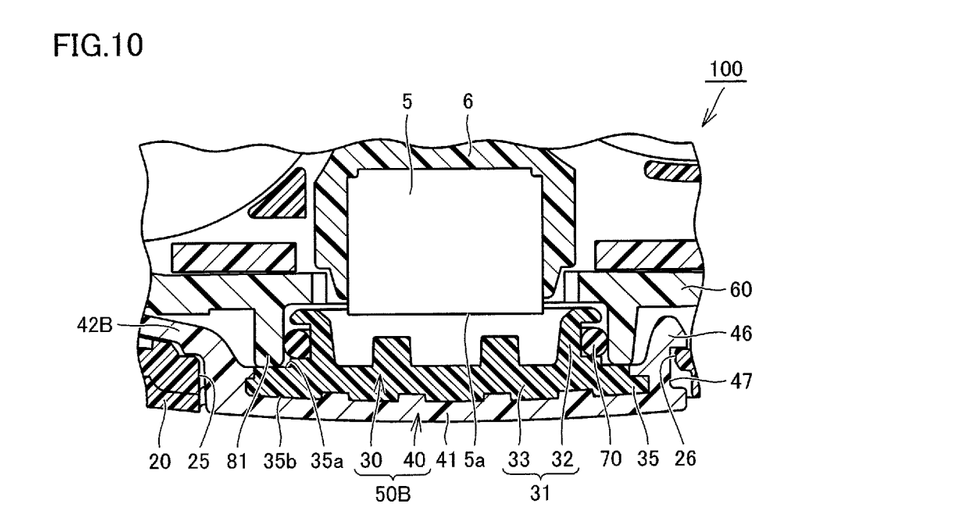
FIG. 10 is a cross sectional view of a principal part showing the second terminal cover shown in FIG. 3 and its neighborhood.

FIG. 10 is a cross sectional view of a principal part showing the second terminal cover shown in FIG. 3 and its neighborhood. Referring to FIG. 10, the structure of second terminal cover 50B will be described. Second terminal cover 50B basically has a structure similar to that of first terminal cover 50A.

As shown in FIG. 10, second terminal cover 50B protects USB connector 5 located in opening 25 of housing 3, and removably closes opening 25. USB connector 5 and inner frame 60 described above are located in opening 25.

USB connector 5 is supported by a USB connector support 6 located on the inner side of inner frame 60. Inner frame 60 includes a surrounding portion 81 which surrounds leading end 5a of USB connector 5.

Second terminal cover 50B is different from first terminal cover 50A in terms of the shape of a stopper 42B. Stopper 42B is connected to a surface of plate-like portion 41 of second resin member 40 that faces USB connector 5, and is located to extend substantially in parallel to the longitudinal direction of second terminal cover 50B (the lateral direction of mobile terminal device 100 when display 1 is seen from the front). Stopper 42B is inserted into an insertion portion located between inner frame 60 and housing 3. A locking portion (not shown) is located on the leading end side of stopper 42B, and stopper 42B is locked into housing 3 by the locking portion.

With second terminal cover 50B closing opening 25, engaging protrusion 46 engages with an engagement hole 26 located in opening 25, and plug 31 covers USB connector 5. Peripheral wall 32 of plug 31 is located on the inner side of surrounding portion 81, and packing 70 being compressed comes into contact with the inner peripheral surface of surrounding portion 81 and the outer peripheral surface of peripheral wall 32. Accordingly, liquid, such as water, is less likely to enter the inner side of inner frame 60 through opening 25.

When removing first terminal cover 50A and second terminal cover 50B from housing 3, a user hooks his/her nail on hook 47 to pull first terminal cover 50A and second terminal cover 50B in a direction away from housing 3. Accordingly, engaging protrusion 46 and engagement hole 23 are disengaged from each other, and first terminal cover 50A and second terminal cover 50B rotate in a direction away from housing 3 with the vicinity of the bases of stoppers 42A and 42B serving as the rotation center. As a result, first terminal cover 50A and second terminal cover 50B are removed.

When pulling first terminal cover 50A and second terminal cover 50B apart from housing 3, a load is applied to the interface between first resin member 30 and second resin member 40 constituting first terminal cover 50A and second terminal cover 50B. In the second embodiment, depressions 36a to 36f are located at least partly on the outer edge of first surface 35a of flange 35 of first resin member 30, and second resin member 40 covers depressions 36a to 36f from the second surface 35b side of flange 35 to the first surface 35a side across the outer edge.

Accordingly, the contact area between first resin member 30 and second resin member 40 can be increased, and first resin member 30 and second resin member 40 can be integrated more firmly. As a result, in the terminal cover according to an embodiment and mobile terminal device 100 including this, first resin member 30 and second resin member 40 can be less likely to be separated from each other.

By locating hollows 37a to 37d in depressions 36a to 36d, respectively, and covering hollows 37a to 37d with second resin member 40, the contact area between first resin member 30 and second resin member 40 can be increased further. Accordingly, the load on the interface can be distributed further, and first resin member 30 and second resin member 40 can be still less likely to be separated from each other.

By locating through-holes 38a to 38d in depressions 36a to 36d, respectively, and filling through-holes 38a to 38d with second resin member 40, second resin member 40 is located to partly surround depressions 36a to 36d. Accordingly, first resin member 30 and second resin member 40 can be still less likely to be separated from each other.

By locating notches 39a to 39d in flange 35 so as to extend inwardly from outer edge 35c of flange 35, adhesion between first resin member 30 and second resin member 40 can be improved. In this respect as well, first resin member 30 and second resin member 40 can be still less likely to be separated from each other.

By integrating second resin member 40 with first resin member 30 so as to conform to the recessed and projecting features in the surface of first resin member 30 opposite to the surface facing earphone terminal 4, the contact area between first resin member 30 and second resin member 40 can be increased further. Accordingly, first resin member 30 and second resin member 40 can be still less likely to be separated from each other.

Second Embodiment

Figure 11:
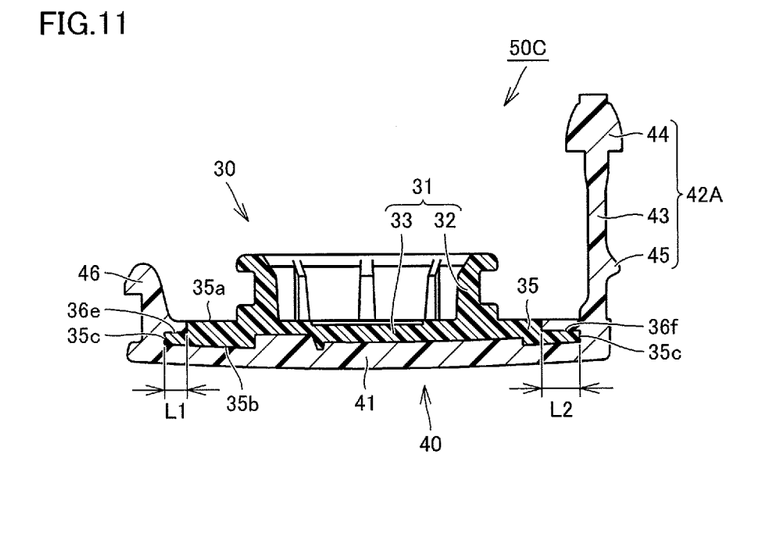
FIG. 11 is a cross sectional view of a terminal cover according to a second embodiment.

FIG. 11 is a cross sectional view of a terminal cover according to a second embodiment. Referring to FIG. 11, a first terminal cover 50C according to the second embodiment will be described.

As shown in FIG. 11, comparing first terminal cover 50C according to the second embodiment with first terminal cover 50A according to the first embodiment, they differ in structure of depressions 36e and 36f of flange 35 of first resin member 30. The remaining structure is almost similar.

In the second embodiment, in a direction in which stopper 42A and engaging protrusion 46 are aligned (the longitudinal direction of first terminal cover 50C), a depressed amount L2 by which depression 36f located on the one end side is indented from outer edge 35c is larger than a depressed amount L1 by which depression 36e located on the other end side is indented from outer edge 35c.

When removing first terminal cover 50C from housing 3, a user hooks his/her nail on hook 47 of first terminal cover 50C to pull first terminal cover 50C in a direction away from housing 3. On this occasion, first terminal cover 50C rotates in a direction away from housing 3 with the vicinity of the base of stopper 42A serving as the rotation center. Therefore, a load is likely to be applied to the vicinity of the base of stopper 42A.

In the second embodiment, since the depressed amount of depression 36f is larger than the depressed amount of depression 36e, the contact area between first resin member 30 and second resin member 40 can be increased in the region where a load is likely to be applied. Accordingly, first resin member 30 and second resin member 40 can be still less likely to be separated from each other.

The above first and second embodiments have been described illustrating the case where the width of flange 35 in the short-side direction of first resin member 30 is almost equal to the outer diameter of peripheral wall 32, but this is not a limitation. The width of flange 35 may be smaller or larger than the outer diameter of peripheral wall 32. If the width of flange 35 in the above-described short-side direction is smaller than the outer diameter of peripheral wall 32, flange 35 is located partly on the outer periphery of bottom 33 except for the outer periphery in a section where bottom 33 protrudes from flange 35. If the width of flange 35 in the above-described short-side direction is larger than the outer diameter of peripheral wall 32, flange 35 is located entirely along the outer periphery of bottom 33.

The above first and second embodiments have been described illustrating the case where the electronic device is a mobile terminal device, such as a mobile phone, a smartphone, and a tablet terminal, but this is not a limitation. A mobile computer, a digital camera or the like may be employed. The terminal cover according to the present disclosure is also applicable to them.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic device comprising:
a housing having an opening;
a connection terminal located in the opening;
a terminal cover including a first resin member having a first surface facing the connection terminal and a second surface located opposite to the first surface, and a second resin member located on the second surface,
at least a portion of the second resin member covering a depression located on the first surface of the first resin member, wherein the second resin member is immovably fixed to the first resin member, and
the second resin member includes a stopper located on one end of the second resin member and configured to be locked in the housing, and an engagement protrusion located on the other end of the second resin member and configured to removably engage with the housing, and
in a direction in which the stopper and the engagement protrusion are aligned, a depressed amount of the depression located on the one end is larger than a depressed amount of a depression located on the other end.

2. The electronic device according to claim 1, wherein the depression includes a hollow dented inwardly from an outer edge of the first surface, and
the second resin member is located so as to cover the hollow.

3. The electronic device according to claim 1, wherein the depression includes a through-hole extending through the depression from the first surface to the second surface, and
the second resin member is located so as to fill the through-hole.

4. The electronic device according to claim 1, wherein the first surface includes a notch located so as to extend inwardly from an outer edge of the first surface, and
the second resin member is located so as to fill the notch.

5. The electronic device according to claim 1, wherein a surface of the first resin member opposite to a surface of the first resin member facing the connection terminal includes recessed and projecting features, and
the second resin member is integral with the first resin member so as to conform to the recessed and projecting features.

6. The electronic device according to claim 1, wherein the second resin member completely surrounds an outer peripheral edge of the first resin member.

* * * * *